United States Patent
Wisecarver

(10) Patent No.: US 6,905,252 B2
(45) Date of Patent: Jun. 14, 2005

(54) OPTICAL INTERCONNECTION SUB-ASSEMBLY

(75) Inventor: Martin Wisecarver, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/224,827

(22) Filed: Aug. 21, 2002

(65) Prior Publication Data

US 2004/0037509 A1 Feb. 26, 2004

(51) Int. Cl.[7] .............................................. G02B 6/38
(52) U.S. Cl. ....................................................... 385/55
(58) Field of Search .......................... 385/55, 81, 76–87, 385/139, 134, 90, 91, 52, 53, 88, 92–93, 44, 49, 12, 56

(56) References Cited

U.S. PATENT DOCUMENTS

| | | | |
|---|---|---|---|
| 5,481,634 A | 1/1996 | Anderson et al. | 385/76 |
| 5,574,813 A | 11/1996 | Chudoba et al. | 385/81 |
| 5,577,145 A | 11/1996 | Musk | 385/88 |
| 5,577,146 A | 11/1996 | Musk | 385/92 |
| 5,737,346 A | 4/1998 | Stenstrom | 372/21 |
| 5,818,993 A | 10/1998 | Chudoba et al. | 385/81 |
| 5,896,481 A | 4/1999 | Beranek et al. | 385/90 |
| 6,086,263 A | 7/2000 | Selli et al. | 385/88 |
| 6,234,683 B1 * | 5/2001 | Waldron et al. | 385/78 |
| 6,364,685 B1 | 4/2002 | Manning | 439/357 |
| 2002/0003917 A1 | 1/2002 | Sherrer et al. | 385/12 |

* cited by examiner

Primary Examiner—J. F. Duverne
(74) Attorney, Agent, or Firm—Workman Nydegger

(57) ABSTRACT

The present invention generally is directed to an optical interconnection sub-assembly, which includes a housing, a longitudinal bore formed through the housing, a tapered ring press-fitted into a first end of the longitudinal bore, a split sleeve ring press-fitted into the tapered ring, a fiber stop press-fitted into the split sleeve ring, and one or more bushings threaded into a second end of the longitudinal bore. The interconnection generally operates to secure a fiber in one end and communicate a signal received from the fiber to a device attached thereto. Further, the interconnection generally does not require any epoxy or other chemical affixation methods, as press fitting and shrink fitting methods are employed, which substantially reduces the assembly time.

32 Claims, 2 Drawing Sheets

OPTICAL INTERCONNECTION SUB-ASSEMBLY

BACKGROUND OF THE INVENTION

1. Field of the Invention

Embodiments of the invention generally relate to optical fiber technology, and more specifically, to optical interconnection devices used to connect an optical fiber to an optical device or component.

2. Description of the Related Art

Optical fibers have generally replaced copper wire as the preferred medium for carrying telecommunications signals. As with copper wire, it is necessary to provide for the interconnection of optical fibers, during installation, repair, or replacement of the fibers, and to terminate the fibers onto active optical devices. Optical devices include, for example, optical switches, optical sensors, and transceivers. The termination of an optical fiber may be indirect, i.e., the fiber may be connected to some other (passive) optical device, such as a beam splitter or polarizer, before the optical signal is directed to the active optical device. The present invention is generally directed to an optical interconnection sub-assembly for a termination of an optical fiber.

Optical interconnection sub-assemblies are generally manufactured over a significant period of time as a result of the amount of time it takes to cure the components epoxied inside the sub-assembly. An optical interconnection subassembly generally includes a housing having one or more components therein, such as a fiber stop, ferule-receiving sleeve, or securing bushing. Each component is generally secured to the housing using an epoxy. The securing epoxy takes some time to cure, and consequently, this curing time hinders the manufacturing process of optical interconnection sub-assemblies and reduces the manufacturing throughput.

Therefore, a need exists for an easily manufactured, efficient, and cost effective optical interconnection sub-assembly that overcomes the disadvantages of conventional optical interconnection sub-assemblies.

SUMMARY OF THE INVENTION

Embodiments of the invention are generally directed to an optical interconnection sub-assembly. In one aspect, the optical interconnection sub-assembly includes a housing having a longitudinal bore formed therethrough, a tapered ring secured to a first end of the longitudinal bore, a split sleeve ring secured to the tapered ring, a fiber stop secured to the split sleeve ring, and one or more bushings secured to a second end of the longitudinal bore. Each of the components is generally press-fitted into the housing, and therefore, no epoxy or curing time is required to manufacture the optical interconnection sub-assembly of the invention.

Embodiments of the invention further provide an optical interconnection sub-assembly having a first end and a second end. The first end of the optical interconnection sub-assembly is configured for coupling the optical interconnection sub-assembly to an optical device, while the second end of the optical interconnection sub-assembly is configured for receiving a terminal end of an optical fiber. The sub-assembly includes one or more bushings positioned at the second end of the sub-assembly. The bushings are configured for receiving and holding the terminal end of the optical fiber in the sub-assembly. The sub-assembly further includes a split sleeve ring positioned at the first end of the sub-assembly. The split sleeve ring is configured for holding the terminal end of the optical fiber. The split sleeve ring may include a fiber stop secured inside the split sleeve ring. The fiber stop is configured for abutting against the terminal end of the optical fiber.

BRIEF DESCRIPTION OF THE DRAWINGS

So that the manner in which the above recited features of the invention may be understood in detail, a more particular description of the invention, briefly summarized above, may be had by reference to the embodiments thereof, which are illustrated in the appended drawings. It is to be noted, however, that the appended drawings illustrate only typical embodiments of the invention, and are therefore, not to be considered limiting of its scope, for the invention may admit to other equally effective embodiments without departing from the true scope thereof.

DETAILED DESCRIPTION OF THE PREFERRED EMBODIMENT

Embodiments of the invention are generally directed to an optical interconnection sub-assembly. The optical interconnection sub-assembly may be used to connect a terminal end of an optical fiber to an optical device, such as a transceiver or an optical switch, for example. At a front end of the optical interconnection sub-assembly, the optical interconnection sub-assembly is configured to receive the terminal end of the optical fiber. At a back end, the optical interconnection sub-assembly is configured to be connected to an optical device. The optical interconnection sub-assembly generally includes a housing with a longitudinal bore formed through the housing. One or more bushings are placed inside a front end of the longitudinal bore, and a tapered ring is press-fitted inside a back end of the longitudinal bore. A split sleeve ring is press-fitted into the tapered ring, and a fiber stop is press-fitted inside the split sleeve ring. The bushings and the split sleeve ring are generally configured to receive and hold a terminal end of the optical fiber. The split sleeve is configured to hold the fiber stop in addition to the terminal end of the optical fiber. In operation, the bushings and the split sleeve ring hold the terminal end of the optical fiber while the fiber stop abuts against the terminal end of the optical fiber. Generally, the fiber stop is aligned with the terminal end of the optical fiber such that an optical signal transmitted from the terminal end of the optical fiber passes through the fiber stop with minimal connection loss.

Figure 1:
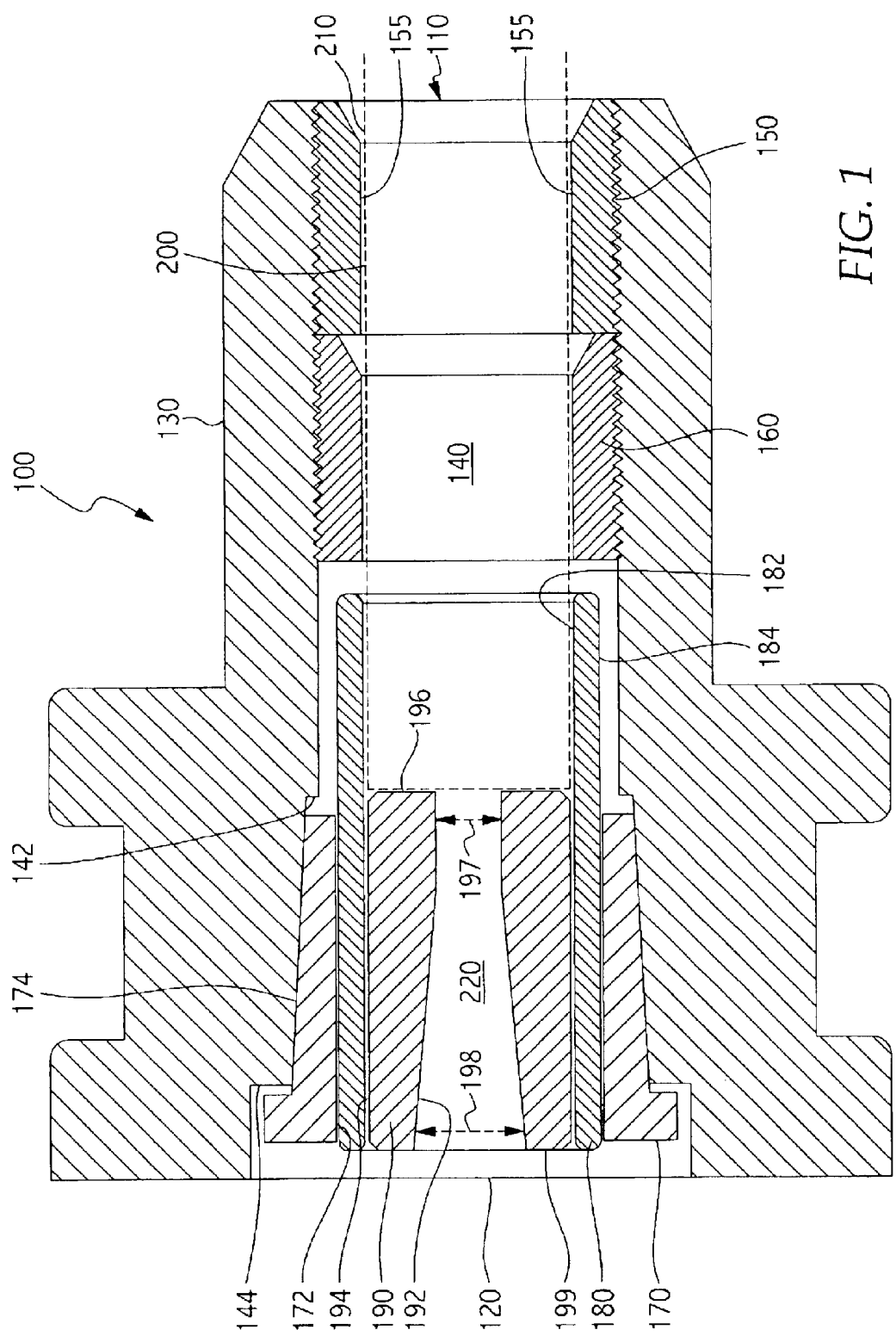
FIG. 1 illustrates a side cross sectional view of an optical interconnection sub-assembly in accordance with an embodiment of the present invention.

FIG. 1 illustrates a side cross sectional view of an exemplary optical interconnection sub-assembly 100 of the invention. The optical interconnection subassembly 100 is generally configured to receive a terminal portion of an optical fiber 200 at a front end 110 of the sub-assembly 100. The back end 120 of optical interconnection sub-assembly 100 is configured to couple to an optical device, such as, an optical switch, a transceiver, and the like. The optical interconnection subassembly 100 generally includes an elongated housing 130 having a longitudinal bore 140 formed therethrough. The longitudinal bore 140 has a front end that coincides with the front end 110 of the sub-assembly 100 and a back end that coincides with the back end 120 of the sub-assembly 100. The longitudinal bore 140 is generally shaped to hold one or more optical components. For example, the longitudinal bore 140 may be threaded at the front end, cylindrical at the middle, and tapered at the back end. Generally, the longitudinal bore 140 has a diameter of about 1 mm to about 1.25 mm. The housing 130 may be made from a stainless steel material or a heat treated alloy, such as, stainless steel with a condition H 1150 or 430, or Carpenter® custom 718 or 630. In this manner, the housing 130 is generally manufactured from a material that has lesser ductility than the components contained therein.

The optical interconnection sub-assembly 100 further includes a first bushing 150 and a second bushing 160 positioned proximate the front end 110. The first bushing 150 and the second bushing 160 may be positioned inside the optical interconnection sub-assembly 100 by being pressed into the front end of the longitudinal bore 140. Alternatively, a unitary bushing may be implemented in lieu of the first bushing 150 and the second bushing 160. Regardless of the number of bushings implemented, the bushings may be double or single threaded, and may be configured to receive and hold the optical fiber 200 therein. More specifically, the inside surface portion 155 of the bushings is generally configured to hold the outer diameter surface 210 of the optical fiber 200. Additionally, the inner diameter of the bushings may be configured to receive and secure an optical ferrule (not shown) encasing an optical fiber therein. The bushings are generally manufactured from a material that matches the thermal expansion of the housing 130, such as, materials with a coefficient of thermal expansion (CTE) of 416, 303 or 302 and beryllium copper. However, if two bushings are implemented, embodiments of the invention contemplate that the first bushing 150 may be manufactured from a different material than the second bushing 160.

Furthermore, in order for the respective bushings to be properly secured into the end of housing 130, the perimeter of exterior surfaces of the respective bushings may have finger members, i.e., members resembling threads without the spiraling pattern associated with threads, extending therefrom. The extending finger members may be used to gauge and regulate the securing force applied to the respective bushings, as the fingers are generally configured to crush or deform at specific forces. These specific crush forces may be correlated with specific securing forces, and therefore, used to regulate the securing force applied to the respective bushings. Factors that may be determinative of the crush force of a particular finger include the physical structure/shape of the finger and the composition thereof, i.e., softer metals may be used to generate lower securing forces, while harder less deformable metals may be used to generate higher securing forces.

The optical interconnection sub-assembly 100 further includes a tapered ring 170, a split sleeve ring 180, and a fiber stop 190 positioned near the back end 120 of the sub assembly 100. The tapered ring 170 has an inner surface 172 and an outer surface 174 that is tapered. The inner surface 172 generally defines a cylindrical bore having a uniform diameter. The outer surface 174 generally defines a cylindrical solid having an increasing diameter going from the middle portion of the sub-assembly 100 to the back end 120 of the sub-assembly 100. The tapered ring 170 is generally press-fitted into the longitudinal bore 140 at the outer surface 174 such that the tapered outer surface 174 slidably engages the longitudinal bore 140 to secure the tapered ring 170 inside the longitudinal bore 140. That is, the tapered ring 170 is held or secured against the inside portion of the housing 130 primarily by friction. In this manner, no epoxy is required to hold the tapered ring 170 against the inside portion of the housing 130. In order to facilitate press fitting the tapered ring 170 into the longitudinal bore 140, the longitudinal bore 140 is generally shaped to receive the tapered ring 170. For example, the longitudinal bore 140 may be angled so as to facilitate press-fitting the tapered ring 170 into the longitudinal bore 140. The longitudinal bore 140 may also include an inner ledge 142 and an outer ledge 144. The inner ledge 142 and the outer ledge 144 are configured to stop the tapered ring 170 from going too far into the longitudinal bore 140. The tapered ring 170 may be made from a non-heat treated material that is more ductile than the housing 130, such as copper or steel, for example. As will be made clear in the following paragraphs, the tapered ring 170 is configured to hold the split sleeve ring 180 and the fiber stop 190.

Figure 2:
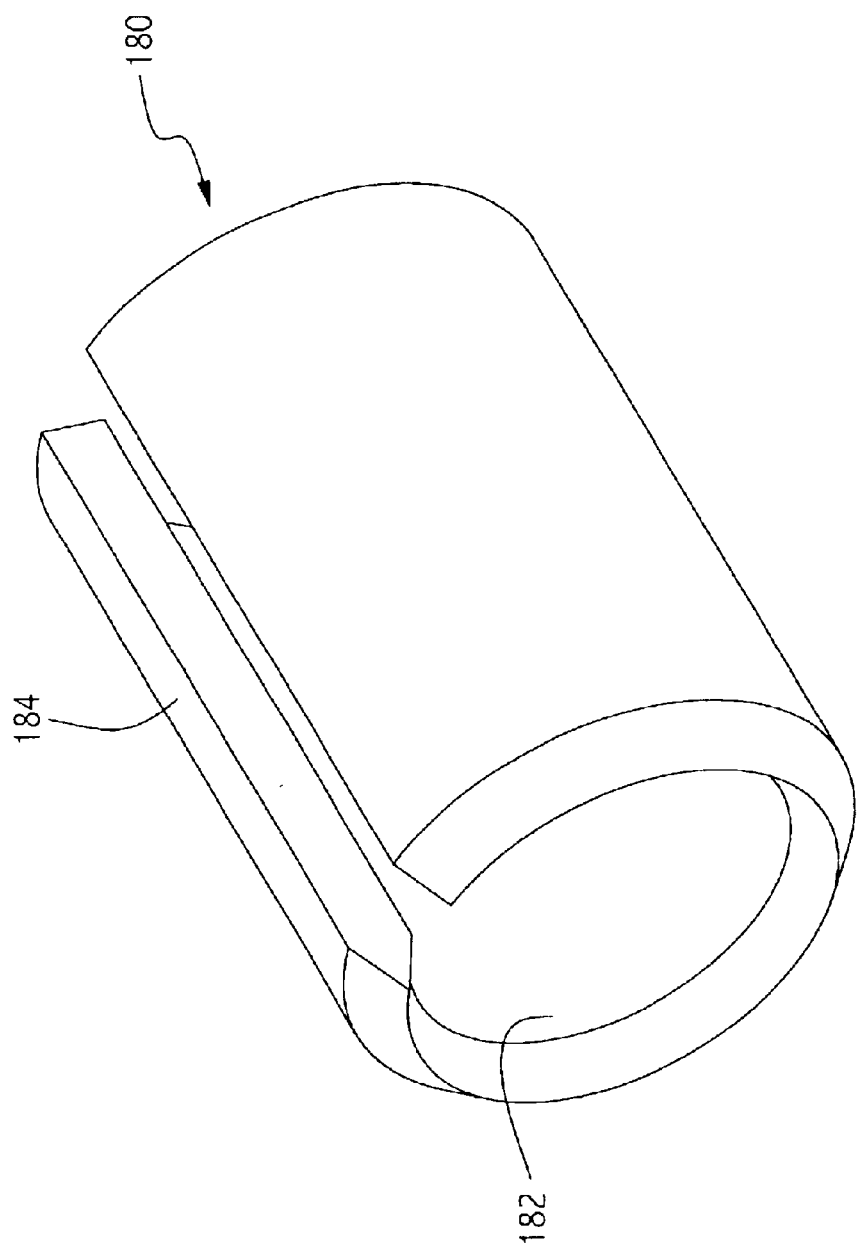
FIG. 2 illustrates a perspective view of the split sleeve ring in accordance with an embodiment of the present invention.

Press-fitted against the inner surface 172 of the tapered ring 170 is the split sleeve ring 180, which has an inner diameter surface 182 and an outer diameter surface 184. The split sleeve ring 180 includes a slit, along its length, extending from one end to the other end. In other words, the split sleeve ring 180 includes a longitudinal section that has been removed so as to enable the split sleeve ring 180 to expand and contract according to the size of the component (e.g., fiber stop 190) contained inside the split sleeve ring 180. More particularly, a longitudinal strip is removed from the sleeve ring 180, which generates a C-shaped solid, as illustrated in FIG. 2. Once assembled into the sub-assembly 100, the outer diameter surface 184 is pressed against the inner surface 172 of the tapered ring 170. This configuration operates to hold the split sleeve ring 180 inside the tapered ring 170 primarily by friction. In this manner, no epoxy is required to hold the split sleeve ring 180 against the inner surface 172 of the tapered ring 170. The split sleeve ring 180 may also be separated from the second bushing 160 by a distance. In this manner, the split sleeve ring 180 is placed proximate the second bushing 160. The split sleeve ring 180 may be made from stainless steel, ceramic, beryllium copper, or any material with a proper elastic deformation characteristics, i.e., materials configured to expand to receive the optical fiber 200 therein and then contract to secure the optical fiber 200 inside the split sleeve 180. The split sleeve ring 180 is configured to hold the fiber stop 190 and the terminal end of the optical fiber 200. The inside diameter of the split sleeve ring 180 may be slightly less than the outside diameter of the optical fiber 200 to be received therein, so as to accommodate the optical fiber 200 and firmly secure the optical fiber 200 inside the split sleeve ring 180.

A fiber stop 190 is generally press-fitted against the inner diameter surface 182 of the split sleeve ring 180. The fiber stop 190 has an inner diameter surface 192 and an outer diameter surface 194, which is press-fitted against the inner diameter surface 182 of the split sleeve ring 180. The fiber stop 190 is, therefore, held inside the split sleeve ring 180 primarily by friction. In this manner, no epoxy is required to hold or secure the fiber stop 190 against the inner diameter surface 182 of the split sleeve ring 180. The outer diameter of the fiber stop 190 is generally slightly greater than the inner diameter of the split sleeve ring 180 so as to enable the split sleeve ring 180 to firmly secure the fiber stop 190 therein. The fiber stop 190 (at its front end 196) is configured to stop a terminal end of the optical fiber 200, such that the fiber stop 190 abuts against the terminal end of the optical fiber 200. The fiber stop 190 further includes a tunnel cavity 220 configured for passing an optical signal transmitted from the terminal end of the optical fiber 200. The tunnel cavity 220 has a first diameter 197 at the front end 196 of the fiber stop 190 and a second diameter 198 at the back end 199 of the fiber stop 190, which is significantly larger than the first diameter 197. The first diameter 197 at the front end 196 is designed to be smaller than the outside diameter of the optical fiber 200 so as to prevent the terminal end of the optical fiber 200 from passing through the fiber stop 190. The diameter of the tunnel cavity 220 gradually increases from the front end 196 of the fiber stop 190 to the back end 199 of the fiber stop 180 so as to provide an optical clearance for the optical signal transmitted from the optical fiber 200. The fiber stop 190 is generally aligned with the terminal end of the optical fiber 200, such that the optical signal from the terminal end of the optical fiber 200 passes through the tunnel cavity 220 with minimal connection loss, thus forming a low loss optical path. The fiber stop 190 may be longitudinally positioned anywhere inside the split sleeve ring 180. The back end 199 of the fiber stop 190, however, is generally parallel with the back end of the split sleeve ring 180, and the length of the fiber stop 190 is generally about half the length of the split sleeve ring 180. The fiber stop 190 may be manufactured from a material with a low coefficient of thermal expansion, e.g., 416.

While the foregoing is directed to embodiments of the present invention, other and further embodiments of the invention may be devised without departing from the basic scope thereof, and the scope thereof is determined by the claims that follow.

What is claimed is:

1. An optical interconnection sub-assembly, comprising:
   a housing having a longitudinal bore formed therethrough;
   a retention ring substantially disposed within a first end of the longitudinal bore;
   a split sleeve ring substantially disposed within the longitudinal bore and at least partially disposed within an interior portion defined by the retention ring and configured to operably retain a terminal end of an optical fiber;
   a fiber stop substantially disposed within the split sleeve ring; and
   one or more bushings secured within a second end of the longitudinal bore.

2. The optical interconnection sub-assembly of claim 1, wherein the retention ring is press-fitted into the first end of the longitudinal bore.

3. The optical interconnection sub-assembly of claim 1, wherein the split sleeve ring is press-fitted into the retention ring.

4. The optical interconnection sub-assembly of claim 1, wherein the retention ring has an outer surface that is at least partially tapered.

5. The optical interconnection sub-assembly of claim 1, wherein the one or more bushings are press fitted into the second end of the longitudinal bore.

6. The optical interconnection sub-assembly of claim 1, wherein the retention ring is press-fitted into the first end of the longitudinal bore, wherein the split sleeve ring is press-fitted into the retention ring, wherein the fiber stop is press-fitted into the split sleeve ring, and wherein the one or more bushings are press fitted into the second end of the longitudinal bore.

7. The optical interconnection sub-assembly of claim 1, wherein the optical interconnection sub-assembly comprises a first end and a second end, the first end of the optical interconnection sub-assembly being configured for coupling the optical interconnection sub-assembly to an optical device, the second end of the optical interconnection sub-assembly being configured for receiving a terminal end of an optical fiber.

8. The optical interconnection sub-assembly of claim 7, wherein the first end of the optical interconnection sub-assembly is on the same side as the first end of the longitudinal bore, and the second end of the optical interconnection sub-assembly is on the same side as the second end of the longitudinal bore.

9. The optical interconnection sub-assembly of claim 1, wherein the one or more bushings are configured for receiving and holding a portion of an optical fiber.

10. The optical interconnection sub-assembly of claim 1, wherein the split sleeve ring is configured for holding the fiber stop and a terminal end of an optical fiber.

11. The optical interconnection sub-assembly of claim 1, wherein the fiber stop is configured for abutting against a terminal end of an optical fiber.

12. The optical interconnection sub-assembly of claim 1, wherein the fiber stop is aligned with a terminal end of an optical fiber such that an optical signal from the terminal end of the optical fiber passes through the fiber stop.

13. The optical interconnection sub-assembly of claim 1, wherein the one or more bushings and the split sleeve ring are configured for holding a terminal end of an optical fiber against the fiber stop such that an optical signal transmitted from the terminal end of the optical fiber passes through the fiber stop with minimal loss.

14. The optical interconnection sub-assembly of claim 1, wherein the fiber stop defines a tunnel cavity formed through the fiber stop.

15. The optical interconnection sub-assembly of claim 1, wherein the fiber stop defines a tunnel cavity formed through the fiber stop, the tunnel cavity being configured for passing through an optical signal transmitted from a terminal end of an optical fiber.

16. The optical interconnection sub-assembly of claim 1, wherein the fiber stop defines a first end and a second end, the fiber stop being configured for abutting against an optical device at the first end and the fiber stop being configured for abutting against a terminal end of an optical fiber at the second end.

17. The optical interconnection sub-assembly of claim 16, wherein the fiber stop defines a tunnel cavity formed through the fiber stop, the tunnel cavity having a first diameter at the first end of the fiber stop and a second diameter at the second end of the fiber stop, the first diameter being larger than the second diameter.

18. The optical interconnection sub-assembly of claim 17, wherein the first diameter is larger than the second diameter so as to provide and optical clearance for an optical signal transmitted from the terminal end of the optical fiber.

19. The optical interconnection sub-assembly of claim 1, wherein the housing is made from one of a heat treated alloy material and a stainless steel material.

20. The optical interconnection sub-assembly of claim 1, wherein the retention ring is made from a non-heat treated alloy material.

21. The optical interconnection sub-assembly of claim 1, wherein the retention ring is made from a material that is more ductile than the housing.

22. The optical interconnection sub-assembly of claim 1, wherein the split sleeve ring is made from one of a stainless steel material, a ceramic material and a beryllium copper material.

23. The optical interconnection sub-assembly of claim 1, wherein the retention ring is secured to the housing by friction.

24. The optical interconnection sub-assembly of claim 1, wherein the split sleeve ring is secured to the retention ring by friction.

25. The optical interconnection sub-assembly of claim 1, wherein the fiber stop is secured to the split sleeve ring by friction.

26. The optical interconnection sub-assembly of claim 1, wherein the one or more bushings are press fitted into the second end of the longitudinal bore to a position proximate the split sleeve ring.

27. An optical interconnection sub-assembly comprising:
   a first end;
   a second end, the first end of the optical interconnection sub-assembly being configured for coupling the optical interconnection sub-assembly to an optical device, the second end of the optical interconnection sub-assembly being configured for receiving a terminal end of an optical fiber;
   one or more bushings at the second end, the bushings being configured for receiving and holding the terminal end of the optical fiber inside the sub-assembly;
   a split sleeve ring at the first end, the split ring being configured for holding the terminal end of the optical fiber inside the sub-assembly; and
   a fiber stop secured inside the split sleeve ring, the fiber stop being configured for abutting against the terminal end of the optical fiber.

28. The optical interconnection sub-assembly of claim 27, wherein the fiber stop abuts against the terminal end of the optical fiber such that an optical signal transmitted from the terminal end of the optical fiber passes through the fiber stop with minimal loss.

29. The optical interconnection sub-assembly of claim 27, further comprising a housing having a longitudinal bore formed therethrough.

30. The optical interconnection sub-assembly of claim 29, further comprising a tapered ring at the first end of the sub-assembly, the tapered ring being secured inside the longitudinal bore.

31. The optical interconnection sub-assembly of claim 29, wherein the one or more bushings are secured inside the longitudinal bore.

32. The optical interconnection sub-assembly of claim 30, wherein the split sleeve ring is secured inside the tapered ring.

* * * * *

UNITED STATES PATENT AND TRADEMARK OFFICE
CERTIFICATE OF CORRECTION

PATENT NO.       : 6,905,252 B2
APPLICATION NO. : 10/224827
DATED            : June 14, 2005
INVENTOR(S)      : Martin Wisecarver It is certified that error appears in the above-identified patent and that said Letters Patent is hereby corrected as shown below:

<u>Column 5</u>
Line 10, after "fiber stop" change "180" to --190--

<u>Column 6</u>
Line 50, Claim 18, before "optical clearance" change "and" to --an--

Signed and Sealed this

Thirty-first Day of July, 2007

JON W. DUDAS
*Director of the United States Patent and Trademark Office*